United States Patent
Yang et al.

(10) Patent No.: US 8,508,091 B2
(45) Date of Patent: Aug. 13, 2013

(54) END COVER AND MOTOR ROTOR HAVING THE END COVER

(75) Inventors: Shih-Jen Yang, Banciao (TW); Hung-Sen Tu, Taishan Township (TW); I-Hsing Chen, Jhonghe (TW); Chen-Chia Yang, Sinjhuang (TW); Chung-En Chen, Hualien (TW)

(73) Assignee: System General Corporation, Taipei (TW)

( * ) Notice: Subject to any disclaimer, the term of this patent is extended or adjusted under 35 U.S.C. 154(b) by 365 days.

(21) Appl. No.: 12/345,792

(22) Filed: Dec. 30, 2008

(65) Prior Publication Data
US 2009/0309448 A1    Dec. 17, 2009

(30) Foreign Application Priority Data
Jun. 11, 2008   (TW) .............................. 97121655 A

(51) Int. Cl.
*H02K 21/14*   (2006.01)

(52) U.S. Cl.
USPC ............. 310/156.22; 310/156.81; 310/156.37

(58) Field of Classification Search
USPC ............. 310/156.12, 156.19, 156.21, 156.22, 310/156.48, 154.17, 154.18, 154.19, 154.21, 310/154.48, 49.05, 156.09, 156.13, 156.23, 310/156.36, 156.38, 156.45, 156.72, 216.114–216.137, 310/156.61, 156.66, 156.79, 156.81
See application file for complete search history.

(56) References Cited

U.S. PATENT DOCUMENTS

| | | | | |
|---|---|---|---|---|
| 4,953,284 A | * | 9/1990 | Hammer et al. ................. | 29/596 |
| 5,808,392 A | * | 9/1998 | Sakai et al. .................... | 310/214 |
| 5,828,152 A | * | 10/1998 | Takeda et al. ............ | 310/156.19 |
| 7,548,006 B2 | * | 6/2009 | Yu ............................. | 310/156.12 |
| 2006/0284506 A1 | * | 12/2006 | Kim et al. ................. | 310/156.13 |
| 2008/0278018 A1 | * | 11/2008 | Achor ....................... | 310/156.12 |
| 2008/0278022 A1 | * | 11/2008 | Burch et al. ............. | 310/156.38 |

FOREIGN PATENT DOCUMENTS

| | | |
|---|---|---|
| TW | 412100 | 11/2000 |
| TW | 579131 | 3/2004 |
| TW | 595072 | 6/2004 |
| TW | 302825 | 12/2006 |
| TW | 312835 | 5/2007 |

* cited by examiner

*Primary Examiner* — Tran Nguyen
*Assistant Examiner* — Naishadh Desai
(74) *Attorney, Agent, or Firm* — Pearne & Gordon LLP

(57) ABSTRACT

An end cover adapted to engage with an end surface of a spindle of a motor rotor is proposed for securely coupling to the spindle with a plurality of permanent magnets disposed around the peripheral wall of the spindle. The end cover has a first surface facing an end surface of the spindle and an second surface opposing to the first surface, which is formed with a plurality of inserting slots indentedly disposed around the rim thereof and corresponding to the permanent magnets for coupling the ends of the permanent magnets, thereby securely fastening each of the permanent magnets to the spindle of the motor rotor. Further, the present invention further provides a motor rotor having the end covers described above.

20 Claims, 6 Drawing Sheets

END COVER AND MOTOR ROTOR HAVING THE END COVER

BACKGROUND OF THE INVENTION

1. Field of the Invention

The present invention relates to end covers for motor rotors, and, more particularly, to a magnetically driven motor rotor having end covers for retaining magnetic bodies.

2. Description of Related Art

A typical motor is comprised of a stator and one or more rotors, wherein the stator is a static component used to provide the magnetic field and the rotor is rotatable according to the magnetic field. The rotor is constituted by a turning spindle and one or more permanent magnets, wherein the turning spindle is typically composed of a stack of silicon steel plates connected and stacked on one another, wherein each permanent magnet is adhered to the peripheral wall of the rotor and faces the stator. However, the permanent magnets are liable to come off due to external usage factors since the magnets are only adhered to the stator, and the detachment of a magnet can cause the rotor to not be able to function normally and possibly even get stuck in the stator.

The external usage factors, as mentioned above, refer to a variety of conditional factors and often involve temperature and humidity factors in the environment where a motor is used. Due to the difference in the thermal expansion coefficient between different constituent components of the permanent magnet and the spindle typically made of silicon steel plates, detachment of the rotor easily occurs when the motor is used under extreme conditions, for example, in a frigid zone or in a very humid zone such as when the motor is used under water. Under such conditions, the metal plates (i.e. silicon steel plates of the turning spindle) can gradually become rusty and the accumulated rust can push against the solidified adhesive layer such that the permanent magnets may detach and come off as a consequence. While such external usage factors do not directly or immediately cause a motor to be defective, the lifespan of the motor is adversely affected by such usage factors. Therefore, improving and overcoming such external environmental factors is as important as the motor per se and cannot be ignored in attempting to design a motor with prolonged lifespan.

To improve the above issues associated with the adhesion of magnets to a motor, several improved techniques have been disclosed in Taiwanese Invention Patent Publication No. 595072, Taiwanese Utility Publication No. 579131, Taiwanese Utility Publication No. 412100, Taiwanese Utility Publication No. M302825 and Taiwanese Utility Publication No. M312835.

It is a common practice to use gap intervals to assemble the spindle with permanent magnets around the peripheral wall of the spindle, such that each of the permanent magnets can be accommodated into a respective trench formed therein. However, problems during assembly often occur due to differing manufacturing and processing techniques used for the silicon steel plates and the permanent magnets, which often increases the defect ratio during assembly since the permanent magnets are fragile and tend to break easily during the assembly process in which they are embedded in respective trenches.

As shown in FIG. 1, Taiwanese Utility Publication No. 412100 discloses a motor rotor structure 1 composed of a stack of silicon steel plates 11, permanent magnets 13, fastening pins 15 and two end covers 17. The plurality of silicon steel plates 11 are stacked on one another and connected to constitute a turning spindle, wherein a plurality of fixing trenches are disposed along the peripheral wall of each silicon steel plate 11 to engage with the fixing pins 15, thereby embedding permanent magnets 13 disposed around the peripheral wall of the spindle formed by a stack of silicon steel plates 11; that is, each permanent magnet 13 is retained between two adjacent fixing pins. An end cover 17 is disposed at each of the two ends of the spindle in order to clamp and hold the permanent magnets 13 and fixing pins 15 in place such that they don't fall out from either end of the spindle.

However, the foregoing method requires the use of additional components—the fixing pins 15—in order to retain the permanent magnets 13, as well as two end covers 17 to prevent compatibility differences from existing therebetween as a result of processing precision, thereby increasing not only costs due to the extra components, but also the costs for assembly and material storage, and further resulting in an increase of the defect ratio during assembly due to assembly compatibility problem. There is a large precision difference in fabricating fixing trenches on each of the stack of silicon steel plates and processing the permanent magnets 13, thus leading to difficulty in controlling precision during assembly due to precision incompatibility (such as a loose match or an excessively tight match due to differences in processing). For example, due to their fragile nature, the permanent magnets 13 can easily be crushed or broken during insertion of the fixing pins 15 in an excessively tight match, causing an increase of defect ratio and thus higher manufacturing costs.

With reference to FIG. 2, Taiwanese Utility Publication No. 595072 discloses a motor rotor structure 2 composed of a spindle 21, a plurality of permanent magnets 23 and holding teeth 25. The spindle 21 is integrally formed of silicon steel material instead of combining a stack of silicon steel plates as commonly used in the prior art. A plurality of interspaced coupling protrusions 211 are formed around the outer peripheral wall of the spindle 21. Each of the permanent magnets 23 is retained between two adjacent coupling protrusions 211 disposed around the outer peripheral wall of the spindle 21, and each holding tooth 25 is inserted into a respective trench formed corresponding in position to a coupling protrusion 211, such that each permanent magnet 23 is secured in position by two adjacent holding teeth 25.

However, the holding teeth 25 need to be made such that they correspond to the size and shape of the permanent magnets 23, and also the coupling trenches need to match up with the coupling protrusions 211, thus increasing difficulty in fabrication and matching precision as well as the costs for fabricating, assembling and storing the holding teeth 25. Further, the holding teeth 25 need to be tightly engaged with the permanent magnet 23 to ensure secure fastening; however, vibrations and loosening of the permanent magnets 23 may occur due to imprecision resulting from processing differences, especially when being subjected to environmental usage factors.

Taiwanese Utility Publication No. 579131 discloses a motor rotor structure of an embedding type characterized by disposing embedding grooves in existing magnetic gap trenches of magnetic conductive plates of the spindle; disposing coupling flanges along the peripheral wall of the opening of the embedding grooves; and disposing assistive positioning plates having a shape corresponding to a magnetic-conductive pieces to engage with one another, wherein the length of the assistive positioning plates only couple to an end of each permanent magnet and no assistive positioning plates are disposed between the gap trenches and the magnets.

However, it is necessary to taper and sharpen the end of each permanent magnet in order for it to be embedded in the groove, such that the end of the magnet suffers from greater stress and is liable to break under pressure, thus compromising the effect of fastening. Further, it is difficult to use a grinding wheel to sharpen a typical permanent magnet that has a thickness of approximately only 3.5 mm in order to obtain satisfactory assembly compatibility with the embedding groove to ensure secure fastening, thus compromising the yield rate in assembling such a motor rotor.

Taiwanese Utility Patent No. M312835 discloses a mechanism for fastening the permanent magnets to a motor rotor structure, characterized by clamping the permanent magnet in between two hollow compressed rings, wherein a plurality of protruding pillars are disposed on one of the hollow compressed rings with each spaced apart at an equal gap interval therebetween, and wherein each protruding pillar comprises a coupling portion disposed on both sides thereof and a fastening aperture disposed in between two coupling portions, while the other hollow compressed ring is formed with a fixing aperture to be axially penetrated therethrough. Each of the permanent magnets comprises a connecting portion on both sides thereof that is adapted to correspondingly engage with a respective coupling portion such that the permanent magnet can be embedded in between two adjacently disposed pillars; and further a plurality of fastening elements, such as bolts, are used to lock each of the fixing apertures to securely assemble the hollow compressed rings, thereby clamping each of the permanent magnets in between the two hollow compressed rings.

However, there are still several drawbacks in employing the above technique: first, the use of locking bolts is problematic because bolts are liable to conduct magnetism and affect the magnetic field; second, the use of tools for locking bolts makes the assembly process cumbersome and inconvenient; third, the use of a total of eight bolts requires the same amount of nuts with the same weight in order to maintain rotational stability under gravity and that further increases the time and costs and complicates processes in manufacture; and fourth, easy loosening and dislocating of the bolts can occur with vibration due to the rotating motions of the motor rotor, resulting in dislocation and detachment of the permanent magnets and thus compromising the lifespan of the motor and the motor rotor.

Summarizing the above, it is desirable and highly beneficial to develop a novel motor rotor structure that can provide a secure fastening effect with a simplified structure for easy assembly that decreases the number of components required and avoids external environmental factors affecting the usage lifespan, and also prevents the magnets from breaking and thus increasing the yield rate during assembly.

SUMMARY OF THE INVENTION

In view of the drawbacks associated with the prior techniques, the present invention provides an end cover and a motor rotor having the end covers that can ensure a secure fastening of the permanent magnets.

The present invention also provides an end cover and a motor rotor having end covers that result in a simplified assembly and decreased number of components required.

The present invention further provides an end cover and a motor rotor having the end covers that offers easy assembly and thus decreases the assembly cost.

In addition, the invention provides an end cover and a motor rotor having the end covers that can prevent the magnets from breaking and thus increase the production yield during assembly.

Moreover, the invention provides an end cover and a motor rotor having the end covers to avoid the damage caused by external environmental factors and affecting the usage lifespan of the motor.

To ensure a secure fastening of the permanent magnets, the present invention proposes an end cover adapted to engage with an end surface of a spindle of a motor rotor for securely fastening a plurality of permanent magnets disposed around a peripheral wall of the spindle. The end cover is comprised of a first surface facing the end surface of the spindle and a second surface opposing to the first surface, wherein the first surface is formed with a plurality of inserting slots indentedly disposed along a rim thereof and corresponding in position to the permanent magnets for allowing an end of each of the permanent magnets to be securely coupled to a corresponding one of the inserting slots.

In the foregoing motor rotor, the end cover may comprise a circular-shaped first body with a second body having a smaller diameter than and axially formed on the first body, wherein a plurality of interspaced protrusions are formed around a circumference of the second body, allowing each of the inserting slots to be formed between any two adjacent ones of the protrusions.

In an aspect of the invention, each of the protrusions may comprise a pair of coupling portions opposite each other for engaging with the end of the permanent magnets. Preferably, the coupling portions are slant sides to be easily coupled to the corresponding magnets. In one embodiment, each of the protrusions is of a Y-shaped or a V-shaped configuration and the two coupling portions thereof are each posited on one of the two sides thereof, respectively. It is to be noted that the shape of the protrusions is not limited to the aspects described in the embodiment.

Likewise, the shape of the end covers is not limited to the aspects described herein. For example, the first body and the second body may be integrally formed by non-magnetically conductive metallic material. Preferably, the non-magnetically conductive metallic material is silicon steel. Alternatively, the first body and the second body may be formed separately by two non-magnetically conductive metallic materials, wherein the non-magnetically conductive metallic material could be silicon steel.

Accordingly, the present invention also provides a motor rotor, which comprises a spindle having a peripheral wall and two end surfaces, a plurality of magnetic bodies disposed around the peripheral wall of the spindle, and each of the magnetic bodies having two opposing ends. In addition, two end covers are respectively coupled to the two end surfaces of the spindle, wherein each of the end covers is comprised of a first surface facing the end surface of the spindle and an opposing second surface, and formed with a plurality of inserting slots indentedly disposed around a rim thereof and corresponding in position to the plurality of magnetic bodies. Each of the inserting slots is capable of being coupled to the end of each of the magnetic bodies, thereby securely fastening each of the permanent magnets to the spindle of the motor rotor.

In the foregoing motor rotor, each of the end covers may have a circular-shaped first body with a second body with a smaller diameter than and axially formed on the first body, wherein the first surface is formed with a plurality of inserting slots indentedly disposed along a rim thereof and corresponding in position to the permanent magnets for allowing an end of each of the permanent magnets to be securely coupled to a corresponding one of the inserting slots. Preferably, the coupling portions are slant sides to be easily coupled to the corresponding magnets. In one embodiment, each of the protrusions is of a Y-shaped or a V-shaped configuration and the two coupling portions thereof are each posited on one of the two sides thereof, respectively. It is to be noted that the shape of the protrusions is not limited to the aspects described in the embodiment.

In summary, the present invention provides an improved motor rotor having the end covers, characterized by employing an insertion design of the end covers to achieve an effect of secure fastening. Compared to the conventional techniques, the present invention provides a simplified structure that is easy to be assembled and thereby reducing the assembly cost as well as the number of components required, Besides, the detachment and breaking disadvantages of the magnets resulted from external environmental factors and the accompanied higher defect ratio of assembly can both be avoided, thus prolonging the lifespan of the motor rotor.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The following illustrative embodiments are provided to illustrate the disclosure of the present invention, these and other advantages and effects can be understood by persons skilled in the art after reading the disclosure of this specification.

Figure 1:
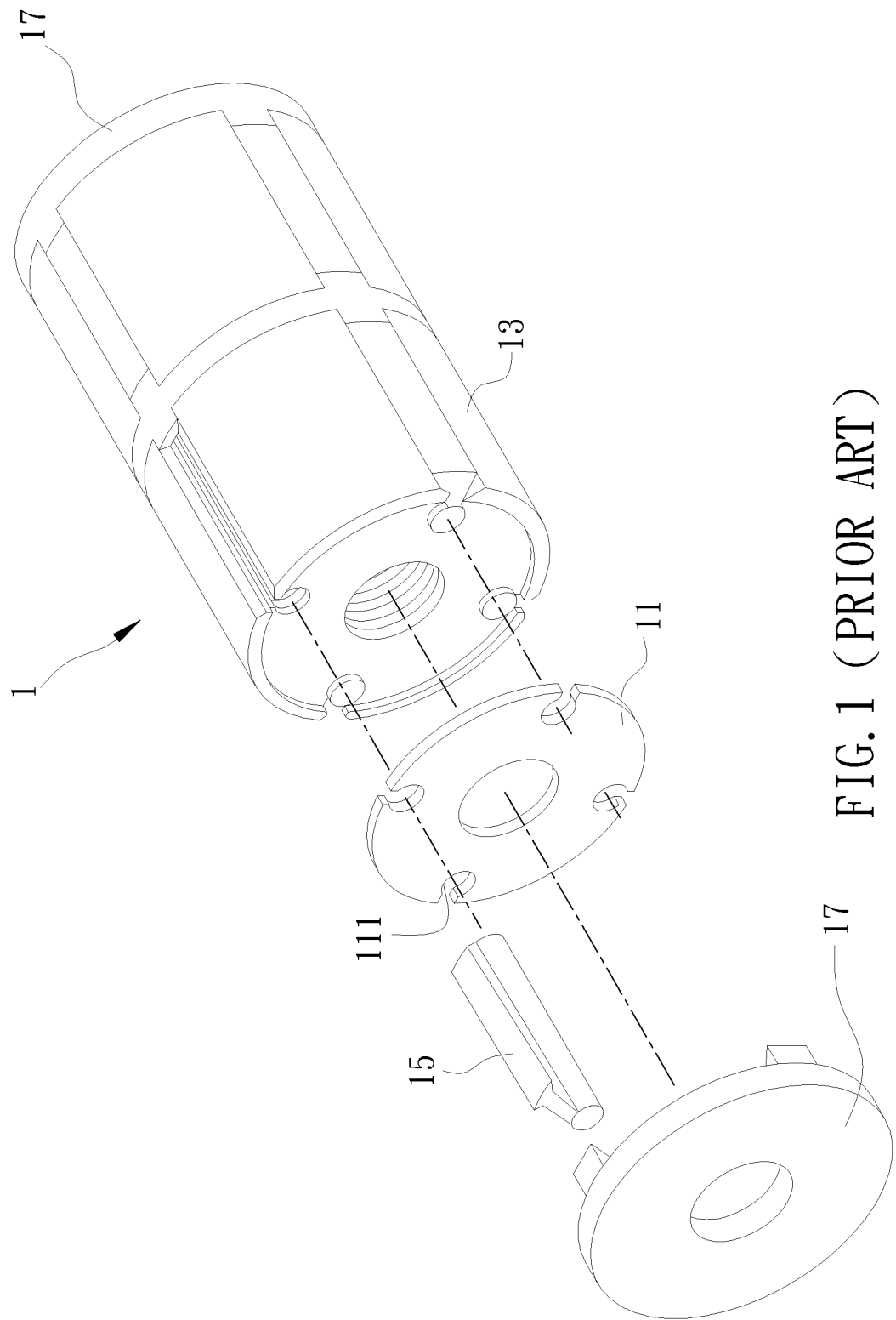
FIG. 1 is a schematic diagram of the conventional motor rotor disclosed in the Taiwanese Patent Publication No. 412100.
Figure 2:
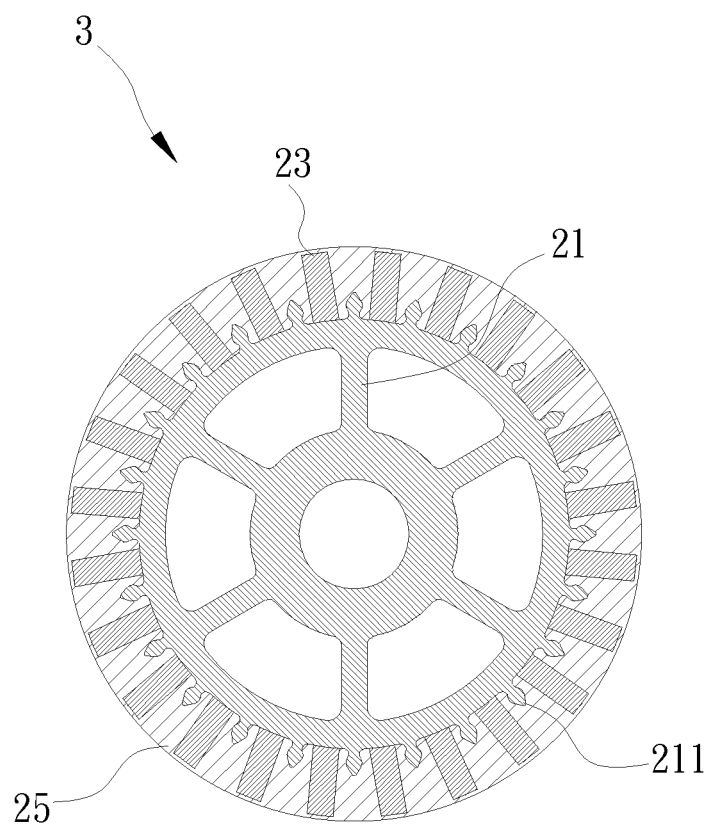
FIG. 2 is a schematic diagram of the conventional motor rotor disclosed in Taiwanese Patent Publication No. 595072.
Figure 3A:
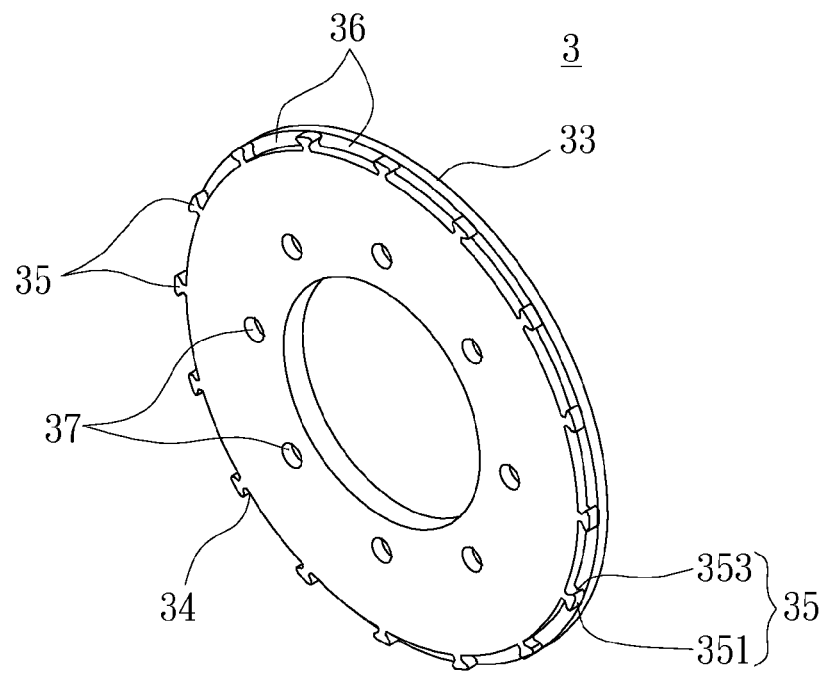
FIG. 3A is a schematic diagram showing the structure of the end cover in accordance with a preferred embodiment of the present invention.
Figure 3B:
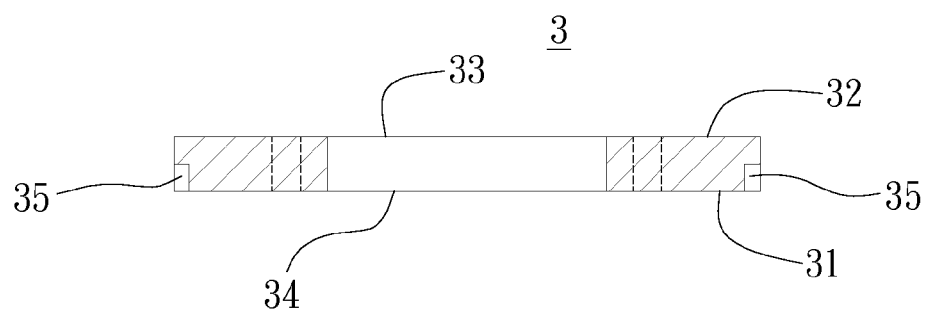
FIG. 3B is a cross-sectional view of a part of the end cover shown in FIG. 3A.

FIGS. 3A and 3B respectively represent a schematic view and a cross-sectional view of the end cover in accordance with a preferred embodiment of the present invention. An end cover is adapted to be coupled to each of the two ends of a spindle 5 of a motor rotor (shown in FIG. 4A), thereby fastening a plurality of magnetic bodies disposed around a peripheral wall of the spindle 5. As illustrated in FIGS. 3A and 3B, the end cover 3 comprises a first surface 31 facing the end surface of the spindle 5 and formed with a plurality of inserting slots 36 indentedly disposed along a rim so as to allow each of the permanent magnets to be securely engaged with the end of a corresponding one of the inserting slots, thereby securely fastening the permanent magnets of the spindle 5 in the motor rotor. Further, there is a second end surface opposing to the first end surface of the end cover 3.

In the embodiment, the end cover 3 is constituted by a circular-shaped first body 33 and a second body 34 while the second body 34 has a smaller diameter than and axially formed on the first body 33 to provide a broadly round-shaped cover, wherein a plurality of interspaced protrusions 35 are formed around a circumference of the second body 34, allowing each of the inserting slots 36 to be formed between any two adjacent ones of the protrusions 35, and the end cover 3 is also formed with a plurality of openings 37, a total of eight openings 37 for example.

According to the embodiment, the first body 33 and the second body 34 are integrally formed by non-magnetically conductive metallic material, wherein the non-magnetically conductive metallic material is silicon steel. In the alternative embodiments, the first body 33 and the second body 34 may be formed separately by other material including non-magnetically conductive sheet metal plates, plastic material, and other non-magnetically conductive equivalents thereto, such as aluminum, copper, zinc, tantalum, stainless steel, and other non-magnetically conductive sheet metal plates.

Each of the protrusions 35 comprises a pair of coupling portions 351 for coupling to the side at the end of each of the permanent magnets. A pair of coupling slants 353 is formed on the two sides of each of the coupling portions 351. In this embodiment, the protrusion 35 may be of a Y-shaped or V-shaped configuration. It is to be noted that the shape of the protrusions 35 is merely illustrative and not to be limited to that as disclosed herein. Further, the protrusions 35 may be a frame-shaped section formed by connecting the ends of the coupling portions 351 to one another. The frame-shaped section may be of a circular, an oval, or a diamond shape etc., which allows forming a pair of coupling slants on the two sides of each of the coupling portions.

Figure 3C:
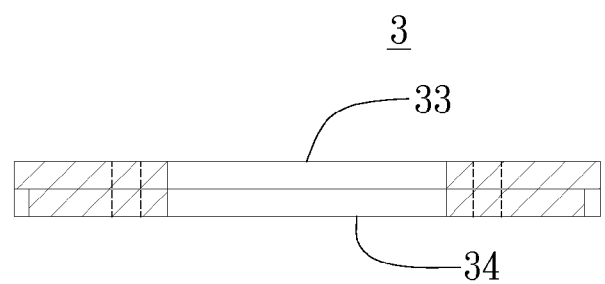
FIG. 3C is a cross-sectional view showing a part of the end cover in accordance with another preferred embodiment of the present invention.

Further, the first body 33 and the second body 34 may be respectively formed by two types of non-magnetically conductive metallic materials and united together, wherein one of the non-magnetically conductive metallic materials could be silicon steel as shown in FIG. 3C. More specifically, in one example as depicted in FIG. 3B, the first body 33 and the second body 34 may be formed integrally by means of shinning or stamping of silicon steel plates, or by molds. Yet alternatively, as illustrated in FIG. 3C, the first body 33 and the second body 34 may be formed respectively by jointing up a stack of silicon steel plates of different sizes. In other words, the end cover 3 may be formed by using various methods other than those disclosed herein.

Figure 4A:
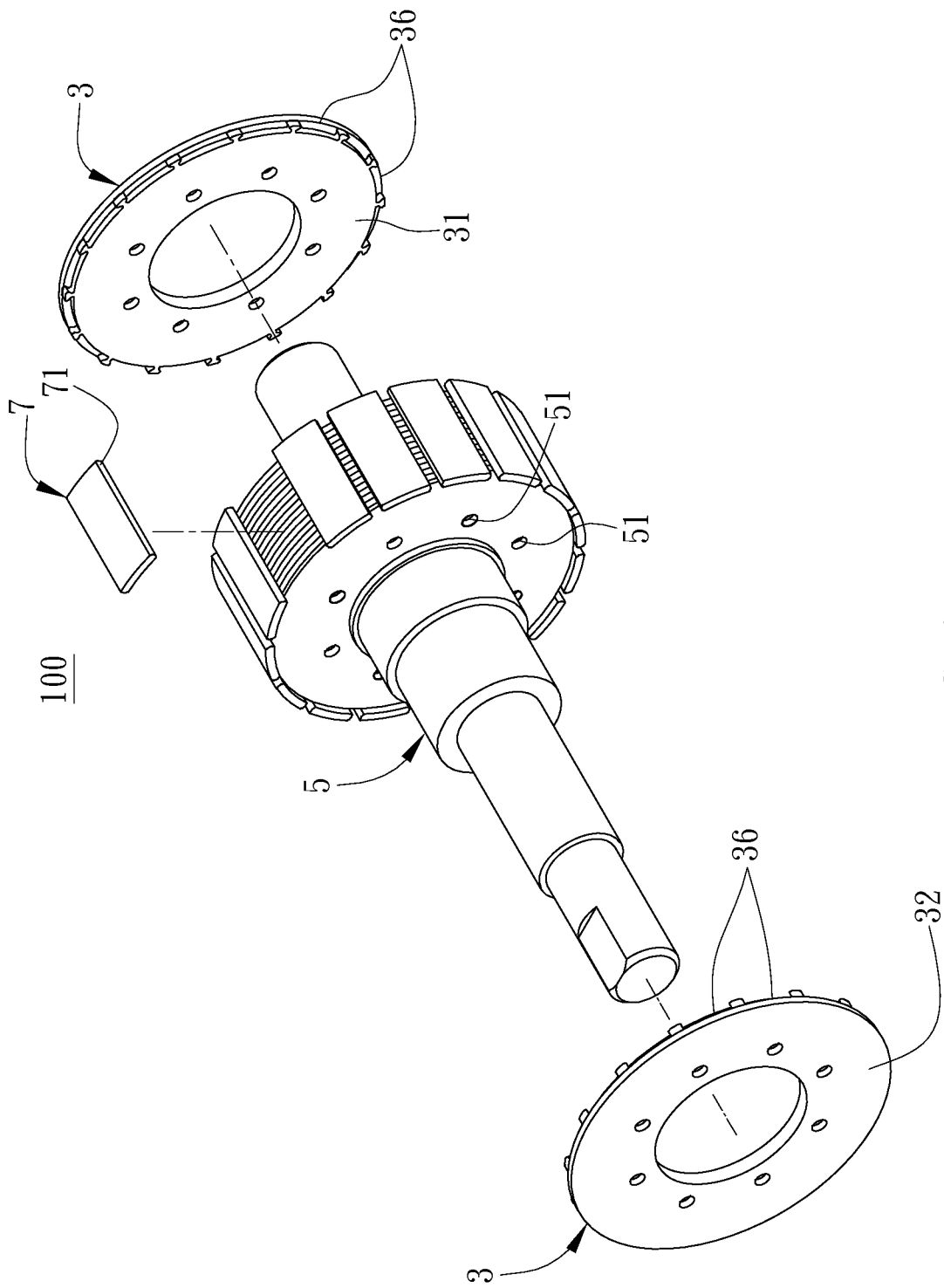
FIG. 4A is an exploded view showing the motor rotor in accordance with another preferred embodiment of the present invention.

FIG. 4A shows the end cover 3 as being coupled to an end surface of the spindle 5 of a motor rotor 100 for securely fastening a plurality of permanent magnets 7 around a peripheral wall of the spindle 5. The motor rotor 100 comprises the spindle 5 having the peripheral wall and two end surfaces, the plurality of permanent magnets 7 disposed around the peripheral wall of the spindle 5, and each of them has an end portion located at both ends thereof Further, each of the two end covers 3 is coupled to the two end surface of the spindle 5 respectively, wherein the end cover 3 is comprised of the first surface 31 facing one of the end surfaces of the spindle 5 and the second surface 32 opposing to the first surface. The first surface 31 includes the plurality of inserting slots 36 indentedly formed along the rim thereof, and corresponding in position to the plurality of permanent magnets 7 so as to allow an end of each of the permanent magnets 7 to be securely coupled to a corresponding one of the inserting slots 36.

In this embodiment, the spindle 5 is formed by a plurality of magnetically conductive plates connected to and stacked on one another, wherein the magnetically conductive plates could be, but are not limited to, silicon steel plates. The spindle 5 is further formed with a plurality of openings 51, a total of eight openings as disclosed herein for example, while the exact number is not limited thereto. However, there is no need to specifically form the openings 51 in the use of the silicon steel plates, since the openings 51 normally exist already therein for the purpose of alignment and/or cooling as well-known in the art. Also, the number, the position and the size of the openings 51 disclosed herein should not be construed as limitative but illustrative in this embodiment. Moreover, the method of connecting a stack of silicon steel plates to form the spindle 5 is omitted herein for clarity and brevity since such a technique is well-known in the art and not among the technical features of the present invention. Further, besides connecting a stack of silicon steel plates in a layered manner to form the spindle 5, the spindle 5 may be integrally formed by silicon steel metals and is in no way limited to that disclosed herein.

Figure 4B:
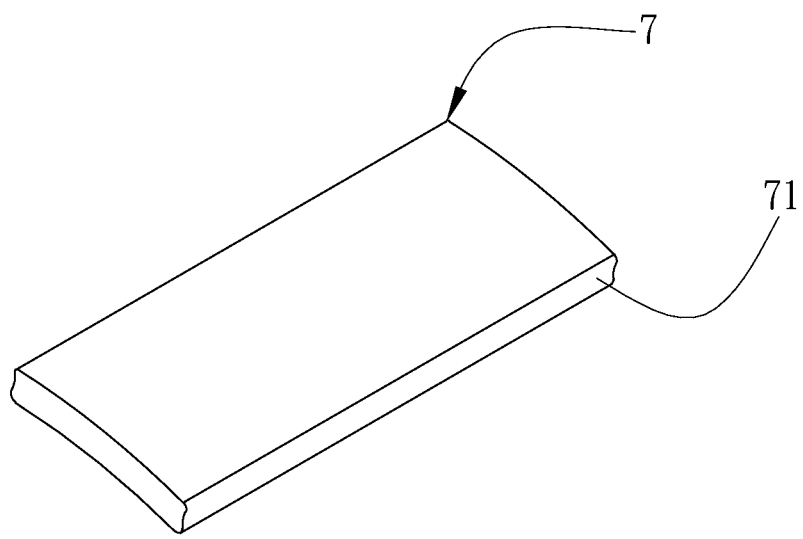
FIG. 4B is an enlarged view of the magnets depicted in FIG. 4A.

As shown in FIG. 4B, the plurality of permanent magnets 7 are disposed along the peripheral wall of the spindle 5, wherein each of the permanent magnets 7 comprises a first surface facing to the peripheral wall of the spindle 5, a second surface opposing to the first surface, and two angled, grooved or curved guiding surfaces 71 while each of them disposed on the two sides thereof respectively. In this embodiment, each of the permanent magnets 7 is an arc piece body corresponding to the peripheral wall of the spindle 5, wherein the guiding surface 71 may be an arc-shaped surface, a wavy-shaped surface, or other equivalents with a shape broadly corresponding to the coupling slants 353. Also, it is to be noted that the shape of the guiding surface 71 is not necessarily limited to that corresponding to the shape of the coupling slants 353 completely.

Figure 5:
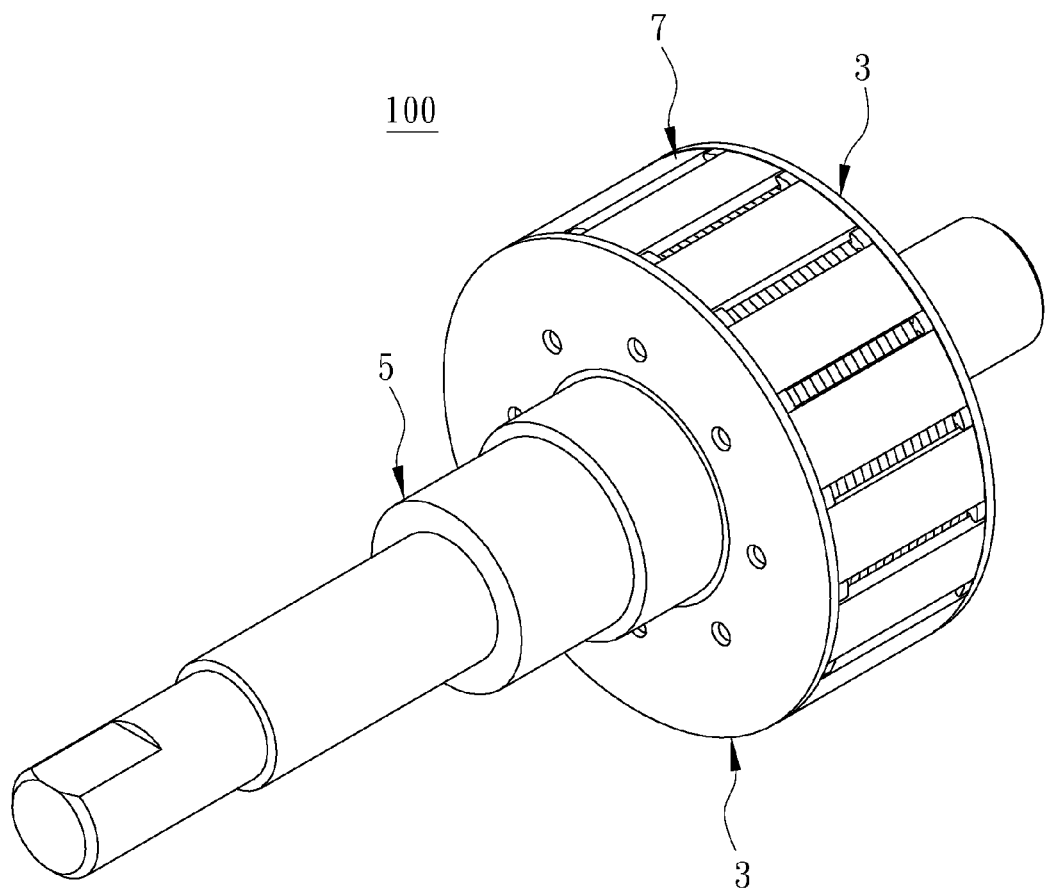
FIG. 5 is a perspective view showing the assembly depicted in FIG. 4A.

Further, the motor rotor 100 may be assembled in the following steps. First, each of the permanent magnets 7 is adhered to the peripheral wall of the spindle 5. Second, the end portion of each of the permanent magnets 7 is coupled to a corresponding inserting slot 36. Next, it is followed by that the two guiding surfaces 71 disposed on the two sides of each of the magnets 7 are coupled to the corresponding slants 353. Thus, each of the end covers 3 is respectively engaged with an end surface of the spindle 5 to fasten each of the magnets 7. Lastly, the openings 51 of the spindle 5 are coupled to the openings 37 of the end covers 3 by means of riveting to complete the assembly process of the motor rotor 100 as depicted in FIG. 5. Each of the end covers 3 herein is connected to an end of the spindle 5 in the motor rotor, and the plurality of magnets 7 are disposed interspacedly around the peripheral wall of the spindle 5. It is to be noted that although each of the end covers 3 is connected to an end of the spindle 5 by riveting in this embodiment, the riveting method should not be construed as limitative to the scope of the present invention.

In summary, the end cover and the motor rotor having two of the end covers proposed by the present invention are characterized by employing an insertion design for the end cover to prevent the magnetic bodies from moving longitudinally so as to achieve a secure fastening of the magnets. Compared to the conventional techniques, the present invention uses only the end covers to securely fasten the magnets without requiring the use of parts such as insertion pins, assistive positioning plates, bolts, and nuts additional to the essential components of the spindle and the magnets, thereby providing a simplified structure for easy assembly that reduces the assembly costs as well as the number of components.

Moreover, in this invention each of the permanent magnets is only partially fastened to the end cover, which allows some degree of flexibility for deformation and the capability to tolerate environmental variations such as temperature and humidity changes. Besides, magnet detachment and breaking issues caused by the adverse external factors that decrease the working period and increase the defect assembly ratio can be prevented to prolong the lifespan of the motor rotor. Consequently, the weaknesses in prior techniques have been overcome by the present invention.

It will be understood that the invention may be embodied in other aspects without departing from the spirit or central characteristics thereof. The present examples and embodiments, therefore, are to be considered in all respects as illustrative and not restrictive, and the invention is not to be limited to the details given herein.

What is claimed is:

1. An end cover for being coupled to an end surface of a spindle of a motor rotor for securely fastening a plurality of permanent magnets disposed around a peripheral wall of the spindle, the end cover comprising:
   a first surface facing the end surface of the spindle and formed with a plurality of first openings, and a plurality of inserting slots indentedly disposed at a rim thereof and corresponding in position to the plurality of permanent magnets, so as to allow an end of each of the permanent magnets to be securely coupled to a corresponding one of the inserting slots directly, wherein the first openings are not disposed on the rim of the first surface; and
   a second end surface opposing to the first end surface and formed with a plurality of second openings corresponding in position to the first openings.

2. The end cover as claimed in claim 1, further comprising a circularly-shaped first body and a second body having a smaller diameter than and axially formed on the first body, wherein a plurality of interspaced protrusions are formed around a circumference of the second body, allowing each of the inserting slots to be formed between any two adjacent ones of the protrusions.

3. The end cover as claimed in claim 2, wherein each of the protrusions comprises a pair of coupling portions opposite each other for coupling to the side at the end of each of the permanent magnets.

4. The end cover as claimed in claim 3, wherein each of the protrusions is of a Y-shaped or V-shaped configuration.

5. The end cover as claimed in claim 3, wherein the coupling portions are slant sides.

6. The end cover as claimed in claim 2, wherein the first bodies and the second bodies are integrally formed by non-magnetically conductive metallic material.

7. The end cover as claimed in claim 6, wherein the non-magnetically conductive metallic material is silicon steel.

8. The end cover as claimed in claim 2, wherein the first bodies and the second bodies are formed separately by two non-magnetically conductive metallic materials.

9. The end cover as claimed in claim 2, wherein the non-magnetically conductive metallic materials are silicon steel plates.

10. A motor rotor, comprising:
   a spindle having a peripheral wall and two end surfaces;
   a plurality of magnetic bodies disposed around the peripheral wall of the spindle, each of the magnetic bodies having two opposing ends; and
   two end covers respectively coupled to the two end surfaces of the spindle, wherein each of the end covers is comprised of a first surface facing the end surface of the spindle and formed with a plurality of first openings and an opposing second surface formed with a plurality of second openings corresponding in position to the first openings, and formed with a plurality of inserting slots indentedly disposed at a rim thereof and corresponding in position to the plurality of magnetic bodies, wherein each of the inserting slots is capable of being coupled to the end of each of the magnetic bodies directly, thereby securely fastening each of the permanent magnets to the spindle of the motor rotor, wherein the first openings are not disposed on the rim of the first surface.

11. The motor rotor as claimed in claim 10, wherein each of the end covers comprises a circular-shaped first body and a second body having a smaller diameter than and axially formed on the first body, wherein a plurality of interspaced protrusions are formed around a circumference of the second body, allowing the inserting slots to be formed between any two adjacent ones of the protrusions.

12. The motor rotor as claimed in claim 11, wherein each of the protrusions comprises a pair of coupling portions opposite each other for coupling to the end of each of the magnetic bodies.

13. The motor rotor as claimed in claim 12, wherein each of the protrusions is of a Y-shaped or V-shaped configuration.

14. The motor rotor as claimed in claim 12, wherein the coupling portions are slant sides.

15. The motor rotor as claimed in claim 11, wherein the first body and the second body are integrally formed by non-magnetically conductive metallic material.

16. The motor rotor as claimed in claim 15, wherein the non-magnetically conductive metallic material is silicon steel.

17. The motor rotor as claimed in claim 11, wherein the first body and the second body are formed separately by two non-magnetically conductive metallic materials.

18. The motor rotor as claimed in claim 17, wherein the non-magnetically conductive metallic materials are silicon steel plates.

19. The motor rotor as claimed in claim 10, wherein the magnetic body is a permanent magnet.

20. The motor rotor as claimed in claim 10, wherein the magnetic body is formed in an arc shape so as to be disposed on the peripheral wall of the spindle.

* * * * *